United States Patent [19]
Banks

[11] Patent Number: 5,281,384
[45] Date of Patent: Jan. 25, 1994

[54] IMPROVED METHOD FOR TRANSFER OF MOLDING MATERIAL IN TWO STAGE INJECTION MOLDING UNITS DURING MOLDING OF PREFORMS

[75] Inventor: William C. Banks, Midland, Tex.

[73] Assignee: Western Container Corporation, Houston, Tex.

[21] Appl. No.: 898,513

[22] Filed: Jun. 15, 1992

[51] Int. Cl.⁵ ............................................. B29C 45/54
[52] U.S. Cl. ............................ 264/297.2; 264/328.19; 425/207; 425/557; 366/77
[58] Field of Search ............. 264/297.2, 328.1, 328.19; 425/562, 557-561, 207; 366/77, 78, 133

[56] References Cited

U.S. PATENT DOCUMENTS 3,117,348  1/1964  Rees .
3,192,299  6/1965  Hendry .
4,290,701  9/1981  Schad .
4,944,906  7/1990  Colby et al. .

Primary Examiner—Jill L. Heitbrink
Attorney, Agent, or Firm—Marshall & Melhorn

[57] ABSTRACT

An improved method for injection molding including the steps of plasticizing a shot of molding material with the extruder running at a high rpm, transferring the shot to an accumulator means with the extruder running at a low rpm, and injecting the shot into a mold cavity.

19 Claims, 6 Drawing Sheets

IMPROVED METHOD FOR TRANSFER OF MOLDING MATERIAL IN TWO STAGE INJECTION MOLDING UNITS DURING MOLDING OF PREFORMS

BACKGROUND OF THE INVENTION

1. Field of The Invention

The present invention relates to methods of molding. More particularly, the invention relates to an improved method of injection molding of preforms.

2. Description of the Prior Art

Molding operations are commonly done with either reciprocating screw or two stage injection units. When an object is to be made by a blow molding process, such as a beverage container, it is common practice to make a parison or a preform as an initial stage of the process. It is common practice in the manufacture of such preforms to use a polyethylene therephthalate (PET) material to make such preforms. Such PET reheat and blow preforms commonly use injection molding equipment of the two stage injection type. This two stage injection system allows the plastication or extruder screw to focus on melting the material, while the shooting pot/plunger system injects the molding plastic into the injection mold.

This separation of functions allows optimization of each of the processes in a relatively independent manner. The major focus of optimization in the plastication or extrusion screw is the minimization of polymer degradation while maintaining melt output. The predominant degradation product generated during standard melt processing is acetaldehyde. Acetaldehyde has been demonstrated to affect the taste of bottled water, cola soft drinks, and other beverages at very low concentration levels.

Separating the plastication function from the injection function also allows the plastication screw to run in a nearly continuous manner, with the screw stopping momentarily just prior to melt transfer from the plastication unit to the injection unit. This mode of operation minimizes degradation of the molten polymer by reducing the amount of sheer heat generated during plastication through the use of reduced speeds. Also, because the screw is operating in a nearly continuous mode, the amount of degradation that occurs due to residence time in the melt is also reduced because the diameter of the screw, and thus its melt residence time, can be reduced when compared to a standard reciprocating screw injection unit.

In general, the two stage injection systems have had the ability to provide melt with acceptable levels of acetaldehyde. However, the acetaldehyde produced by the sheer heat in the plasticizing stage and residence time in the melt are not the only factors determining the acetaldehyde level. Other factors such as the particular material, the particular mix of the preferred material, the size of the shot and other factors are all important in determining the final level of acetaldehyde in the melt. When all of these factors combined, the prior art methods were found to meet specifications, but always on the high end of the specification level, making the process much harder to control. Thus, those skilled in the prior art continued to search for a solution to reduce the acetaldehyde content of the finished product which was traceable to the plastification and transfer function.

SUMMARY OF THE INVENTION

In order to reduce the level of acetaldehyde present in reheat and blow preforms, an improved method is provided which provides for plasticizing a shot of the desired molding material while the plastication or extruder screw is turning at a high rpm, transferring the shot to the shooting pot while the plastication screw is turning at a low rpm, and then injecting the shot into the mold.

Thus, it is an object of the present invention to provide an improved process for the injection molding of preforms, which reduces the degradation products present in the preform.

A further object of the present invention is to provide an improved method for the molding of preforms resulting in greatly reduced acetaldehyde levels.

A still further object of the present invention is to provide an improved method for the manufacture of polyethylene therephthalate reheat and blow preforms using a two stage injection molding system.

It is a further object of the present invention to provide an improved method of the foregoing nature wherein the effects that the transfer portion of the molding cycle has on the generation of degradation products is reduced.

It is a still further object of the present invention to provide an improved method of manufacturing preforms wherein the polymer degradation in the molding process can be significantly reduced by modifying the screw rotational velocity to provide very low speed screw rotation, with or without acceleration, during the transfer portion of the cycle, and a slightly higher than standard screw rotation during the remainder of the molding cycle.

Further objects and advantages of the present invention will be apparent from the following description and appended claims, reference being made to the accompanying drawings forming a part of the specification, wherein like reference characters designate corresponding parts in the several views.

It is to be understood that the present invention is not limited to the details and arrangement of parts illustrated in the accompanying drawings, since the invention is capable of other embodiments, and is capable of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENT

As mentioned above, separating the plastication function from the injection function allows the plastication or extruder screw to run nearly independently of the injection unit. However, the two units must interact during every cycle when the accumulated plasticated material is transferred from the plasticating unit to the injection unit. During this transfer portion of the cycle, the plastication unit must quickly deliver the melt from its accumulator location to the injection unit reservoir. To do this at a reasonable rate, the plastication unit, while maintaining its rotational speed, transfers the melt at a higher pressure than that which is used during the non-transfer portion of the plastication cycle. It is during this transfer that it is believed a large portion of the degradation products found in the melt are produced.

It has been determined that alternate transfer conditions can be used that significantly reduce the amount of degradation products that are generated not only during the transfer portion of the cycle, but during the entire plastication cycle. Specifically, it has been determined that polymer degradation can be significantly reduced by modifying the screw rotational velocity to provide a very low speed screw rotation during the transfer portion of the cycle, and to provide a slightly higher than standard screw rotation during the remainder of the cycle. The dual speed control of the screw measurably reduces the acetaldehyde concentration in the preform by reducing the sheer heating that occurs during the transfer portion of the cycle.

The method of the present invention can be practiced in many types of injection molding operations as long as the plastication or extruding screw can be controlled at a first high speed during the plastication portion of the cycle, and a second, or low, speed during the transfer portion of the cycle.

Figure 1:
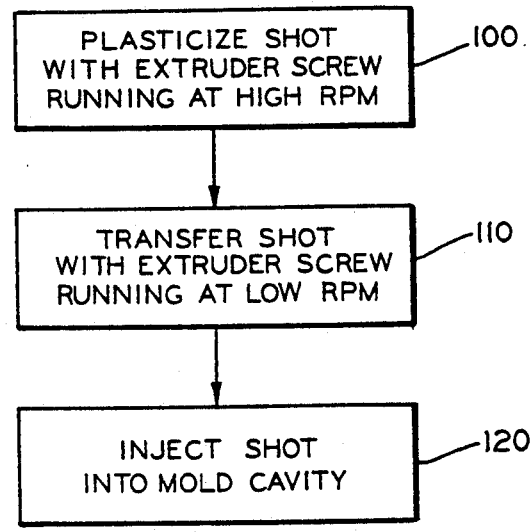
FIG. 1 is a flow chart showing the steps practiced by the method of the present invention.

Referring to FIG. 1, the steps of the basic process are shown. Regardless of which injection molding machine is being used, the first step (Box 100) of the method of the present invention is to plasticize a predetermined quantity or shot of a desired molding material with the extruder screw running at, or slightly above, its normal or high rpm. The next step (Box 200) is to transfer the shot to an accumulator means with the extruder screw at a second or significantly lower rpm. As will be explained below, this may also be accomplished by momentarily stopping the plastication screw, and then very slowly accelerating it.

The last step is to inject the shot into the mold cavity, after which the method of the present invention may be repeatedly practiced during subsequent molding cycles.

In its most preferred embodiment, the method of the present invention is used with a currently existing two stage injection molding machine. Such a machine is diagrammatically illustrated in FIG. 2. A variable speed DC motor 20 drives a plastication or extruder screw 21 by means well known in the art. The plastication screw 21 is reciprocally contained within chamber or housing 22. The chamber 22 has an inlet 23 adapted to receive the material to be plasticized 24 from a hopper 25. In the preferred embodiment of the present invention, the material to be plasticized 24 consists of pellets of polyethylene therephthalate or PET.

The chamber or housing 22 is provided with an outlet 26 to place it in fluid communication with a barrel head 27. The barrel head 27, in turn, fluidly communicates with a distributor 28 having a melt valve 29. The melt valve 29 is rotatable between an open position, in which passageways provided in the distributor 28 and the valve 29 will provide fluid communication between the barrel head and the shooting pot or accumulating means 30, and a closed position, wherein the shooting pot will communicate with the nozzle 35. The size of the accumulated melt before injection into the mold is controlled by the injection piston 31 which closes one end of the shooting pot 30. In some injection molding machines, the size of the shooting pot may be adjusted by shot size adjustment means 36.

Suitable control means are provided by the manufacturer of the molding machine to continuously run the extruder or plastication screw 21 to plasticize a quantity of the material 24 held in the hopper 25. As the plastication screw continues to plasticize material, since in the non-transfer portion of the process the melt valve will be closed in relationship to the chamber 22, plasticized material will first accumulate in the barrel head 27, and then will accumulate in the forward portion of the chamber 22, thereby forcing the plastication screw 21 rearwardly in a manner well known in the art until it reaches its preset position, at which point rotation stops.

The melt valve 29 will then be opened by the control means, and substantially simultaneously the speed of the plastication screw 21 will begin to rotate at a low speed, or the plastication screw will slowly accelerate while the plastication screw is advanced to its forward most point, or the shooting pot becomes full. At this point, the plasticized material 24 will have been fully transferred from the forward end of chamber 22 and barrel head 27 to the accumulating means or shooting pot 30.

It is during this transfer portion of the cycle, in the prior art methods, when the plastication screw 21 is left revolving at a first or high rpm, typically between 40 and 90 rpm, until all of the material has been transferred, that the majority of the degradation products are produced because of the sheer heating that occurs during the transfer portion of the cycle.

Figure 3:
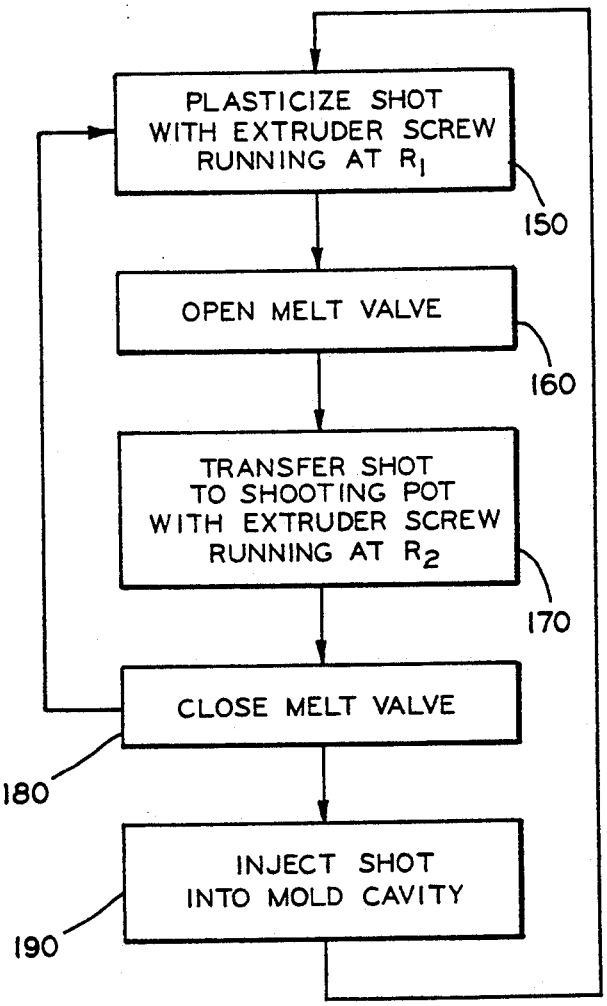
FIG. 3 is a flow chart showing the steps present in a modification of the method of the present invention.
Figure 4A:
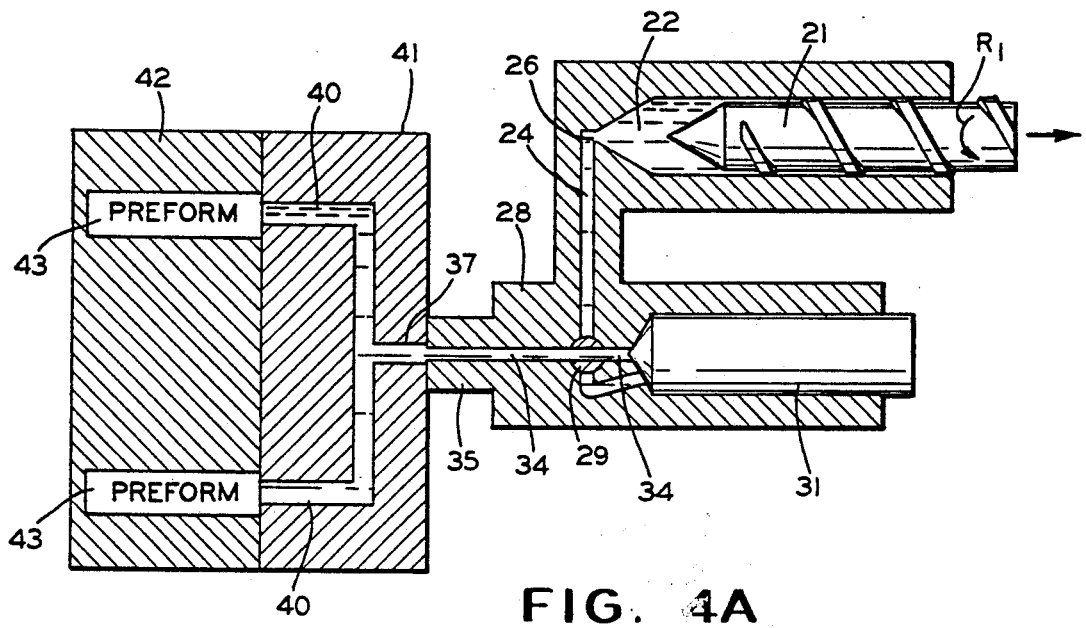
FIG. 4a and FIG. 4b are diagrammatic views representative of a two stage injection molding machine and illustrating the method of the present invention.
Figure 4B:
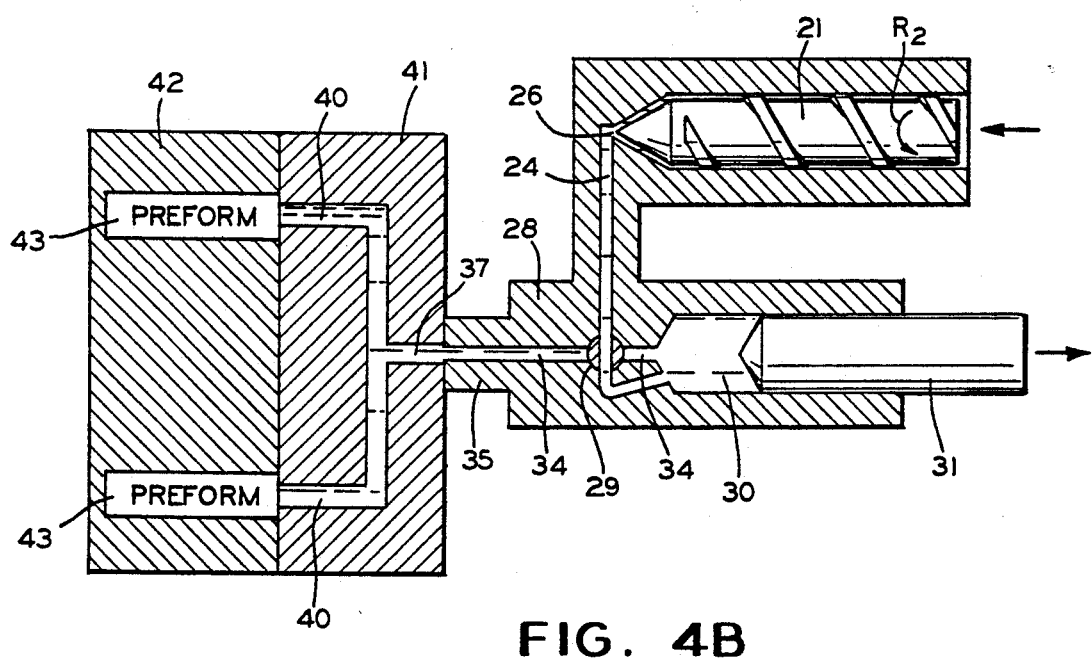

Referring to FIGS. 3, 4a and 4b, the most preferred embodiment of the method of the present invention can be seen in relationship to its use on a two stage injection molding machine.

Figure 2:
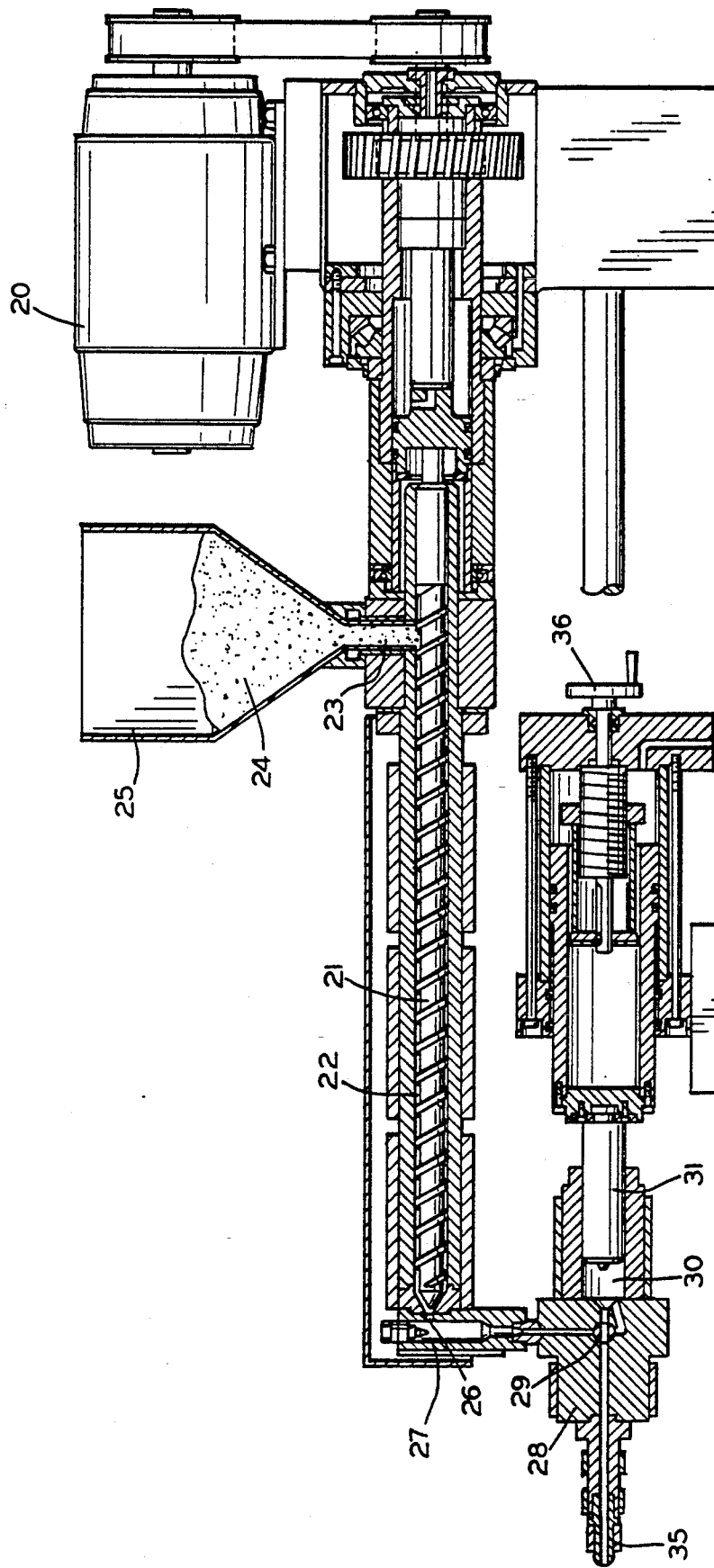
FIG. 2 is a diagrammatic view of a prior art two stage injection molding machine.

In FIG. 4a, a portion of the prior art molding machine shown in FIG. 2 is illustrated at the stage in the molding cycle where the melt valve 29 is closed, and the plastication screw 21 is fully "backed up". The shot is formed in the forward portion of housing 22 and fully ready to be transferred into the shooting pot 30 to be formed by the backward movement of the injection piston 31. Suitable conduits 34 provide communication between the housing 22, the outlet 26, the melt valve 29, the shooting pot 30 and the nozzle 35. The nozzle 35 is in communication with the sprue 37 provided in the manifold 41. The sprue 37, in turn, is in communication with the runners 40 communicating with the preform cavities 43 provided in the mold 42.

Depending upon the particular application to which the method of the present invention is applied, the first step (Box 150) in the most preferred embodiment of the method as practiced with a two stage injection molding machine, is to plasticize a shot or predetermined quantity of molding material such as PET with the extruder screw 21 running at, or slightly above, a first or high rpm $R_1$, typically 40 to 90 rpm. The second step (Box 160) is to open the melt valve as shown in FIG. 4b. The third step (Box 170) is to transfer the shot to the shooting pot 30 while running the extruder screw 21 at a low speed, or a slowly accelerating speed $R_2$, which will force the injection piston 31 in a rearward direction. When the shooting plunger reaches its rearmost position, the screw will move in a rearward direction. At this point, the melt valve will be closed (Box 180) as shown in FIG. 4a, and the injection piston will be moved in a forward direction to inject the shot (Box 190) into the preform cavities 43 through the runners 40. The dramatic reduction in acetaldehydes can be seen by referring to the following examples:

EXAMPLE 1

Figure 6:
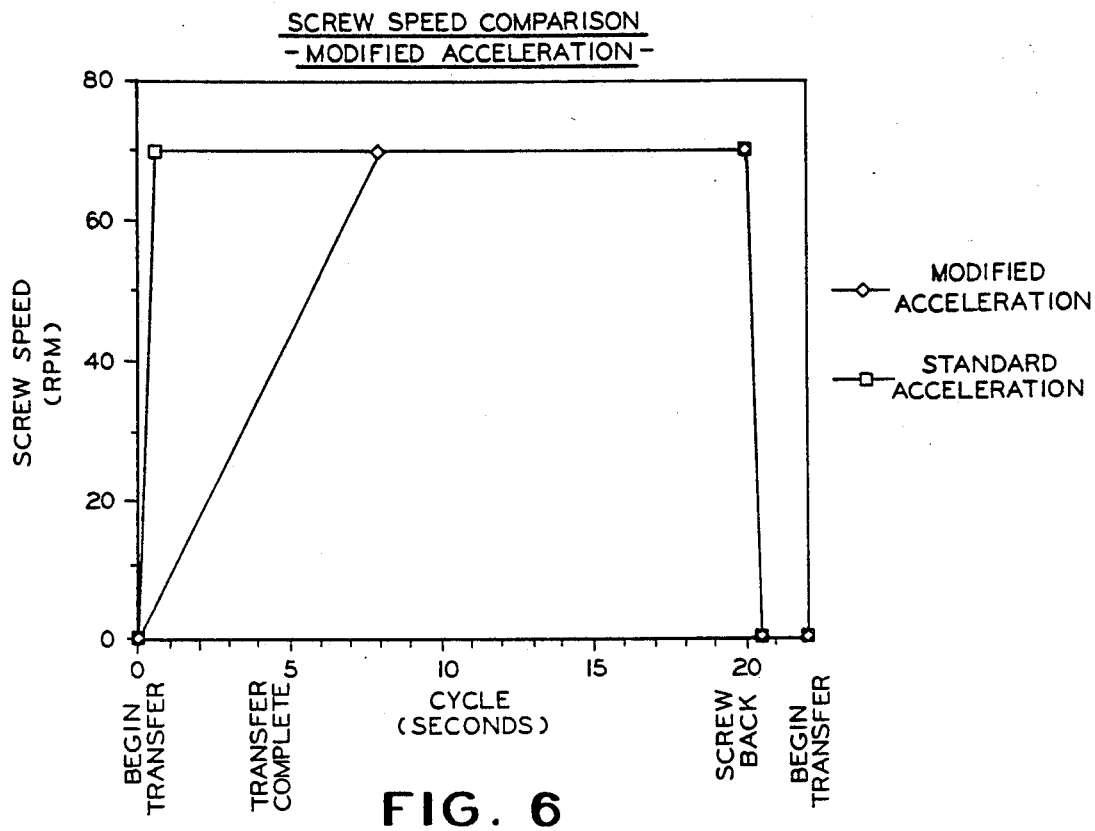
FIG. 6 is a graph showing cycle length vs. screw speed for a modification of the invention wherein the extruder or plasticizer screw is momentarily stopped before transfer begins, and is slowly accelerated while the transfer of molding material takes place.

The first system tested uses a variable speed electric motor coupled through a gear box and gib/spline arrangement to drive the plastication screw in a Husky Model XL 225P injection molding machine, manufactured by Husky Injection Molding Systems, Ltd., Bolton Ontario, Canada. The low speed ($R_2$) transfer control is obtained in this system by momentarily stopping the plasticating screw 21, and then adjusting the acceleration of the screw as it begins its transfer to speed $R_2$, the screw 21 should not accelerate any faster until the transfer is complete. A faster acceleration may then be used until the screw reaches full speed (typically between 40 and 90 rpm) and until to a faster R.P.M. all of the material has been transferred, and the plastication unit is operating under the non-transfer or "back pressure" portion of the cycle. The adjustment needed to produce this slow acceleration is made by adjusting the acceleration rate potentiometer on the regulator module provided with the Husky machine. The potentiometers have been preset for a typical linear acceleration rate of 0.5 seconds to maximum and minimum speed. This time can be adjusted over a range of 0.5 to 30 seconds from a fully stopped condition according to the manufacturer. To provide the acceleration desired, the chart shown in FIG. 6 should be consulted, and the necessary potentiometer adjusted so that those conditions indicated as "Modified Acceleration" are met. Typically, the deceleration rate potentiometer is set to provide the quickest deceleration rate to bring motor 20 to stop, and the acceleration potentiometer is set to provide a slow acceleration to the motor speed so that rearward plastication at full screw speed can occur under low back pressure conditions.

In production trials using the Husky Model XL 225P two stage molding machine with a Reliance Electric DC VS power module, Model No. 802220-2VE to which the necessary adjustments have been made, manufacturing a 25 gram part out of a Hoechst Celanese T-80 resin, produced preforms with an average acetaldehyde concentration of 5.2 micrograms per liter using the standard transfer process. With the dual screw speed transfer process, the same machine manufactured preforms with an average acetaldehyde concentration of 3.0 micrograms per liter.

EXAMPLE 2

In production trials using a Husky Model XL225P dual stage injection molding machine with the same drive and same type of potentiometer setting alteration, a 32 cavity system producing a 52 gram part from an Hoechst Celanese AHT-80 resin manufactured preforms with an average acetaldehyde concentration of 4.2 micrograms per liter using the standard transfer process. With the dual screw speed system, the machine produced parts with an average acetaldehyde concentration of 2.3 micrograms per liter.

Figure 7:
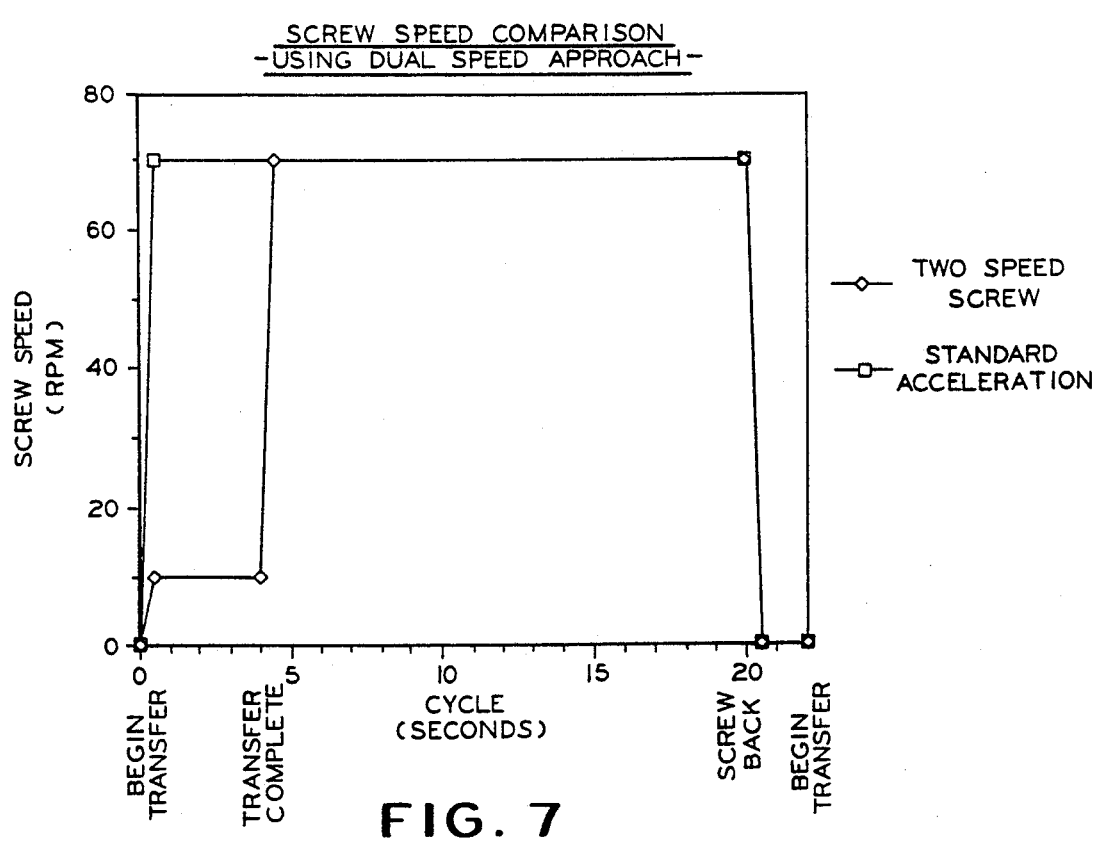
FIG. 7 is a graph showing cycle length vs. screw speed for a modification of the invention where the extruder or plasticizing screw is run at a slower than normal speed while the transfer of molding material to the shooting pot takes place.

While rate of acceleration was used as the control means in the above examples, comparable results are expected if a dual set point speed control, well known in the art, were to be used, with a low speed setting for the transfer, and a slightly higher than standard speed for the plastication portion of the cycle. An example of this is shown in FIG. 7.

EXAMPLE 3

Figure 8:
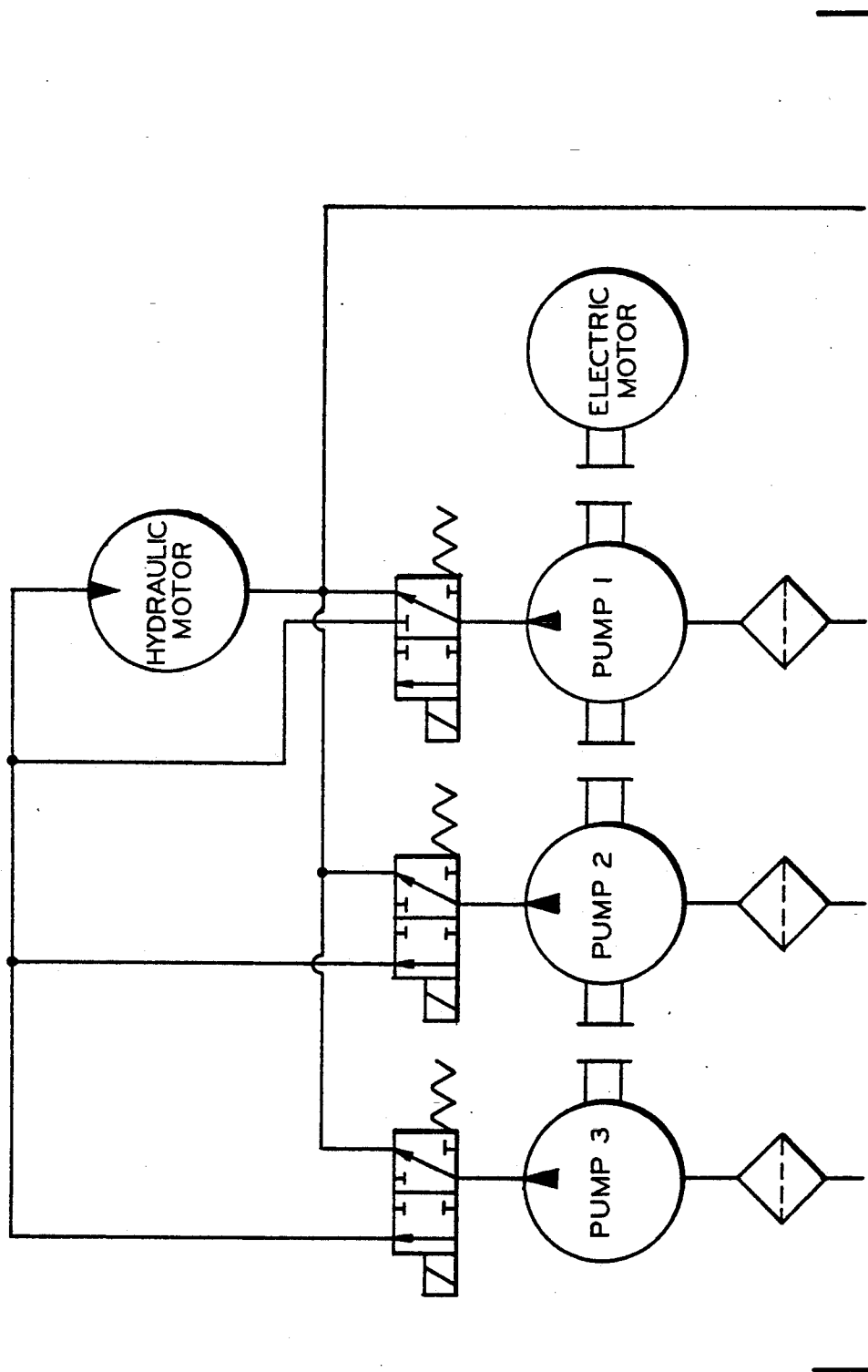
FIG. 8 is a diagrammatic view of a modification of the invention where a dual speed plasticizing or extruding screw incorporates a hydraulic piston motor directly coupled to the screw shaft. Screw speed is controlled in discreet steps by using individual and combined flows from three separate hydraulic pumps.

The second type of system that was used to test the dual extrusion speed concept incorporated a hydraulic piston motor (screw motor) directly coupled to the screw shaft to drive the plastication unit as diagrammatically illustrated in FIG. 8. In this unit, screw speed was controlled in discreet steps by using individual and combined flows from three separate hydraulic pumps (Pump 1 and Pump 2) and Pump 3 to drive the screw motor.

To provide for operation of the pumps, additional relays were used in conjunction with the outputs of the existing PLC in the Husky machine. During the transfer portion of the cycle, the screw was driven by a low volume pump (Pump 1), which typically provided a screw rotation speed of less than 10 rpm. After transfer was complete, and the plastication unit was in the non-transfer or "back pressure" mode, the flow of the second or third hydraulic pump (Pump 2 or Pump 3) was also directed to the screw motor. Screw speeds for this system for the plastication portion of the cycle are comparable to those described in the electric drive examples above.

In production trials, a Husky XL 500P injection molding machine was used. A 72 cavity system manufacturing a 25 gram part from a Goodyear G-8006 resin produced preforms with an average acetaldehyde concentration of 7.0 micrograms per liter using the standard transfer process. With the dual screw speed transfer process, the same machine manufactured preforms with an average acetaldehyde concentration of 3.1 micrograms per liter.

Figure 5:
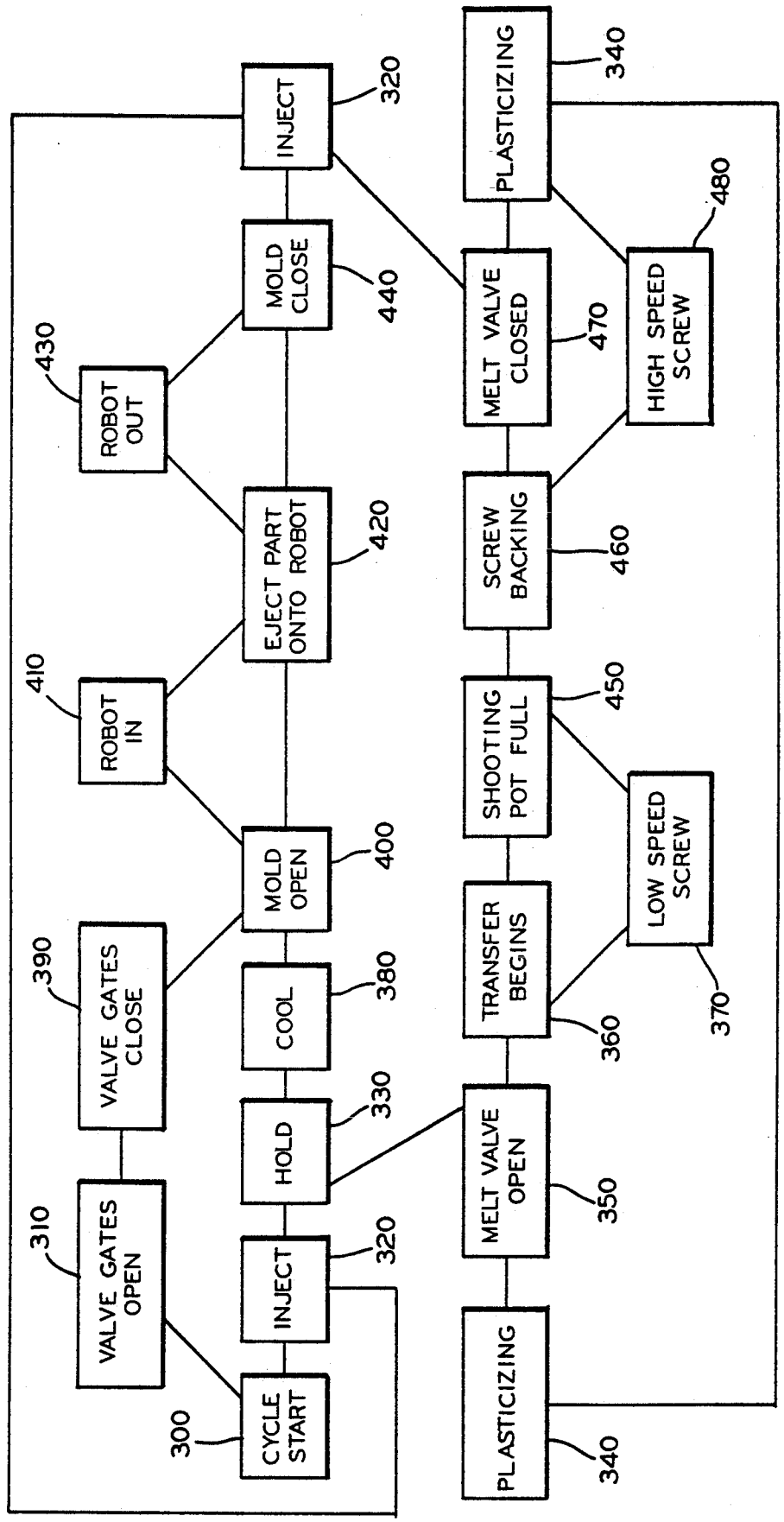
FIG. 5 is a flow chart showing the steps present in the method of the present invention as they relate to the operation of a two stage injection molding machine.

For a full understanding of the method of the present invention, a description of the steps of said method in relationship to the steps present in the standard two stage injection molding machine is desirable. Referring now to FIG. 5, while the flow chart shown therein is applicable to the Husky molding machines described in the previous examples, it is well within the skill of the art to apply the method of the present invention to other machines from the knowledge gained from the flowchart of FIG. 5 as applied to the Husky molding machines.

The first operation which takes place (Box 300) is for the cycle to be started by means well known in the art, after which the valve gates open (Box 310). With the valve gates open, the previously plasticized shot may be injected (Box 320) and a holding cycle (Box 330) begins. While the injection of the previous shot takes place, and the holding cycle begins, the plasticizing screw is plasticizing the next shot to be transferred to the shooting pot.

At the appropriate time, when the plasticizing operation (Box 340) is completed, and the holding cycle is complete, the melt valve opens (Box 350) and the transfer (Box 360) begins while the control means present in the molding machine has operated to control the speed of the plasticizing or extruder screw 21 to the low RPM $R_2$. While these steps are happening, the part has cooled down (Box 380) the valve gates have closed (Box 390) and the mold has opened (Box 400).

In the most recent molding machines, a robot will come in (Box 410) and the parts are ejected (Box 420) onto the robot, at which time the robot moves out (Box 430) and the mold closes (Box 440). With the closing of the mold (Box 440), the mold is ready to receive the next injecting of the plasticized material.

While the steps just described have been taking place, the plasticizing screw 21 has been operating at the lower speed $R_2$ (Box 320) while transferring the shot to the shooting pot (Box 450). Depending on the size of the shooting pot, the plasticizing screw 21 will advance to its forward most position or until the shooting pot is full. If the shooting pot is full, the plasticizing screw may be in a screw backing (Box 460) position at the completion of the transfer and will be operating under back pressure conditions. At this point (Box 470), the plasticizing screw again operates at high rpm (Box 480) as the plasticizing step (Box 340) again begins.

Concurrently with the plasticizing operation occurring, melt valve (Box 470) has closed allowing the injection piston to inject the shot into the mold (box 320) after a cycle start signal (Box 300) has been received by the molding machine.

As evidenced by the previous examples, by much experimentation and study of the problems of acetaldehyde being present in the injection molding of preforms, a novel method solving the problems in the present art has been provided.

What is claimed is:

1. A method of injection molding including the steps of:
   a) plasticizing a desired quantity of a molding material while running the plastication screw at a high RPM,
   b) transferring the plasticized material to an accumulating means while running said plastication screw at a low rpm; and
   c) injecting the plasticized material into a mold cavity.

2. The method defined in claim 1, wherein said high rpm is from 40 to 90 rpm.

3. The method defined in claim 1, wherein said low rpm is from 0.1 to 10 rpm.

4. A method of injection molding preforms, including the steps of:
   a) plasticizing a shot of molding material while running an extruder screw at a high rpm,
   b) transferring said shot of molding material while slowly accelerating the extruder screw from zero to a predetermined rpm; and
   c) injecting said shot into a mold cavity.

5. The method defined in claim 4, wherein said high rpm is from 40 to 90 rpm.

6. The method defined in claim 5, wherein said predetermined rpm is between 40 and 90 rpm.

7. In an injection molding method for use i an injection molding machine including a plasticizing screw and a shooting pot with a melt valve interposed therebetween, said method including the steps of:
   a) plasticizing a shot of molding material with said extruder screw running at a first rpm,
   b) opening said melt valve,
   c) transferring said shot to said shooting pot with said extruder screw running at a second lower rpm,
   d) closing said melt valve; and
   e) injecting said plasticized shot of molding material into said mold cavity.

8. The method defined in claim 7, wherein said first rpm is in the range of from 40 to 90 rpm.

9. The method defined in claim 8, wherein said second lower rpm is in the range of 0.1 to 10 rpm.

10. A method of injection molding for use with a molding machine having a plasticizing screw, a shooting pot, and a melt valve interposed between said extruder screw and said shooting pot, said method including the steps of:
    a) plasticizing a shot of molding material with said extruder running at first rpm,
    b) opening said melt valve,
    c) transferring said shot of molding material to said shooting pot while slowly accelerating said extruder screw from zero to a predetermined second lower rpm,
    d) closing said melt valve; and
    e) injecting said shot of plasticized material into a mold cavity.

11. The method defined in claim 10, wherein said first rpm is in the range of from 40 to 90 rpm.

12. The method defined in claim 11, wherein said second lower rpm is in the range of 0 to 10 rpm.

13. The method defined in claim 10, wherein said first rpm is slightly higher than a standard rpm.

14. A method for operating a two-stage injection molding machine having valve gates communicating with a mold, a plasticizing screw, a shooting pot, and a melt valve interposed between said shooting pot and said plastication screw, said method including the steps of:
    a) starting said cycle,
    b) opening said valve gates,
    c) injecting a previously plasticized shot into said mold while simultaneously beginning to plasticize a subsequent shot of molding material with said plastication screw running at a high rpm,
    d) waiting a hold cycle for the previously injected shot to cool while opening said melt valve,
    e) cooling said mold,
    f) ejecting said parts,
    g) closing said mold and making said mold ready for said shot of molding material being plasticized, all while,
    h) transferring said shot being plasticized to said shooting pot while running said plastication screw at a low rpm until said plastication screw is at its forward most point of travel, or said shooting pot is full; and
    i) closing said melt valve, and again injecting a shot of plasticized material into a mold cavity.

15. A method for operating a two-stage injection molding machine having valve gates communicating with a mold, a plasticizing screw, a shooting pot, and a melt valve interposed between said shooting pot and said plastication screw, said method including the steps of:
a) starting said cycle,
b) opening said valve gates,
c) injecting a previously plasticized shot into said mold while simultaneously beginning to plasticize a subsequent shot of molding material with said plastication screw running at a high rpm
d) waiting a hold cycle for the previously injected shot to cool while opening said melt valve,
e) cooling said mold,
f) ejecting said parts,
g) closing said mold and making said mold ready for said shot of molding material being plasticized, all while transferring said shot being plasticized to said shooting pot while accelerating said plastication screw from 0 rpm at a slow rate of acceleration until said plastication screw is at its forward most point of travel or said shooting pot is full; and i) closing said melt valve, and again injecting a shot of plasticized material into a mold cavity.

16. The method defined in claim 15, wherein said high rpm is in the range of from 40 to 90 rpm.

17. The method defined in claim 15, wherein said high rpm is slightly higher than the standard plasticizing rpm of said molding machine.

18. A method of injection molding, including the steps of:
a) plasticizing a desired quantity of a molding material while running the plastication screw at a high rpm,
b) transferring the plasticated material to an accumulating means while slowly accelerating the extruder screw from zero to a predetermined rpm; and
c) injecting the shot into a mold cavity.

19. A method as defined in claim 18, wherein said high rpm is from 40 to 90 rpm.

* * * * *